United States Patent
Morikawa et al.

(10) Patent No.: US 6,581,553 B2
(45) Date of Patent: Jun. 24, 2003

(54) TWO-STROKE ENGINE

(75) Inventors: Koji Morikawa, Tokyo (JP); Hideharu Takimoto, Tokyo (JP); Yasuo Moriyoshi, Chiba (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/884,590

(22) Filed: Jun. 19, 2001

(65) Prior Publication Data

US 2001/0054398 A1 Dec. 27, 2001

(30) Foreign Application Priority Data

Jun. 23, 2000 (JP) ........................................ 2000-189888

(51) Int. Cl.[7] ................................................ F02B 25/04
(52) U.S. Cl. ................................................ 123/65 VB
(58) Field of Search ..................... 123/65 VD, 65 VB, 123/65 PE, 65 VC, 65 WA, 65 A, 73 PP, 73 C, 73 CA, 73 E, 193.6, 657

(56) References Cited

U.S. PATENT DOCUMENTS

| | | | | |
|---|---|---|---|---|
| 1,156,846 A | * | 10/1915 | Johnson | 123/255 |
| 1,225,702 A | * | 5/1917 | Davol | 123/41.17 |
| 1,643,603 A | * | 9/1927 | Brownback | 123/65 VB |
| 4,399,778 A | * | 8/1983 | Ancheta | 123/54.4 |
| 5,305,720 A | * | 4/1994 | Ando et al. | 123/193.6 |
| 5,775,274 A | * | 7/1998 | Duret et al. | 123/73 A |

FOREIGN PATENT DOCUMENTS

| | | |
|---|---|---|
| DE | 33 22 121 A | 12/1984 |
| DE | 37 18 211 A | 12/1988 |
| EP | 0 464 594 A | 1/1992 |
| FR | 2 581 422 A | 11/1986 |
| JP | 6-288238 | 10/1994 |
| WO | 95 16113 A | 6/1995 |

* cited by examiner

*Primary Examiner*—Gene Mancene
*Assistant Examiner*—Hyder Ali
(74) *Attorney, Agent, or Firm*—Frishauf, Holtz, Goodman & Chick, P.C.

(57) ABSTRACT

In a two-stroke engine, fresh air introduced through a scavenging port into a combustion chamber becomes an air flow directed to a top surface of a piston and is guided by a concave of the piston top surface to produce an reverse tumble flow. A combustion gas is pushed out through an exhaust port, opened and closed by the piston, in a stratified state by the scavenging flow. In addition, when the exhaust port goes down in the closure condition, a strong tumble flow occurs in the combustion chamber , and at an ignition position(point, location) in the vicinity of the top dead center, the reverse tumble flow runs against a squish developing between the piston top surface and a lower surface of a cylinder head and gathers in the concave in a state disturbed.

13 Claims, 9 Drawing Sheets

TWO-STROKE ENGINE

BACKGROUND OF THE INVENTION

1. Field of the Invention

The present invention relates to a two-stroke engine designed to feed fresh air through a scavenging port formed in a cylinder head and discharge a combustion gas through an exhaust port formed in a lower part of a cylinder to be openable and closable in accordance with a piston.

2. Description of the Related Art

A conventional Schnurle (loop) scavenging type two-stroke engine has fuel consumption and emission problems stemming from air-fuel mixture short circuit. A uniflow type two-stroke engine has been known to overcome this problem.

For example, Japanese Unexamined Patent Application Publication No. 6-288238 discloses a downward uniflow type two-stroke engine in which an exhaust port is formed in a lower portion of a cylinder to open and close at, before or after a piston reaches a bottom dead center, and in which a scavenging port is formed in a cylinder head to be opened as a scavenging valve.

However, this conventional technique is designed to accomplish gas exchange simply by establishing a downward scavenging flow in the cylinder, resulting in a lowering of scavenging efficiency because combustion gas remains at upper corner portions of the cylinder. In addition, difficulty is experienced in stratifying an air-fuel mixture in the case of such a downward scavenging flow, and particularly at low-load operations, a problem arises in that the combustion efficiency is lowered.

Furthermore, the two-stroke engine disclosed in the aforesaid Japanese Unexamined Patent Application Publication No. 6-288238 is designed to drive the scavenging valve by an internal pressure of a crank case, which makes it difficult to properly set a scavenging timing in accordance with an engine operating condition for control of the scavenging flow.

SUMMARY OF THE INVENTION

Accordingly, it is an object of the present invention to provide an improved two-stroke engine capable of an efficient combustion at low-load operations.

Another object of the invention is to provide a two-stroke engine capable of easily controlling a scavenging flow to be supplied to a combustion chamber and a scavenging timing.

In accordance with the present invention, there is provided a two-stroke engine having a cylinder block defining a cylinder inside, a piston reciprocally moving within the cylinder and a cylinder head defining a combustion chamber with the piston, comprising a scavenging port formed in the cylinder head to be opened to the combustion chamber at one side with respect to a reference plane passing through a center axis of the cylinder for generating a tumble flow toward a top surface of the piston, and an exhaust port formed in the cylinder block to be opened to the cylinder at the other side with respect to the reference plane in accordance with the reciprocal movement of the piston.

Other features and advantages of the present invention will become more sufficiently understood from the following detailed description.

BRIEF DESCRIPTION OF THE DRAWINGS

FIGS. 1 to 9 are diagrams of a first embodiment of the present invention, FIG. 1 is a diagram of the whole structure of a two-stroke engine;

FIG. 3 is a vertical cross-sectional view showing the two-stroke engine in a compression stroke;

FIG. 4 is a plan view showing a cylinder head;

FIG. 5 is a cross-sectional view taken along a line V—V of FIG. 4;

FIG. 6 is a cross-sectional view taken along a line VI—VI of FIG. 4;

FIG. 7 is a plan view showing a piston;

FIG. 8 is a cross-sectional view taken along a line VIII—VIII of FIG. 7;

FIG. 9 is an explanatory illustration of a driving cycle of the two-stroke engine.

DESCRIPTION OF THE PREFERRED EMBODIMENTS

Figure 1:
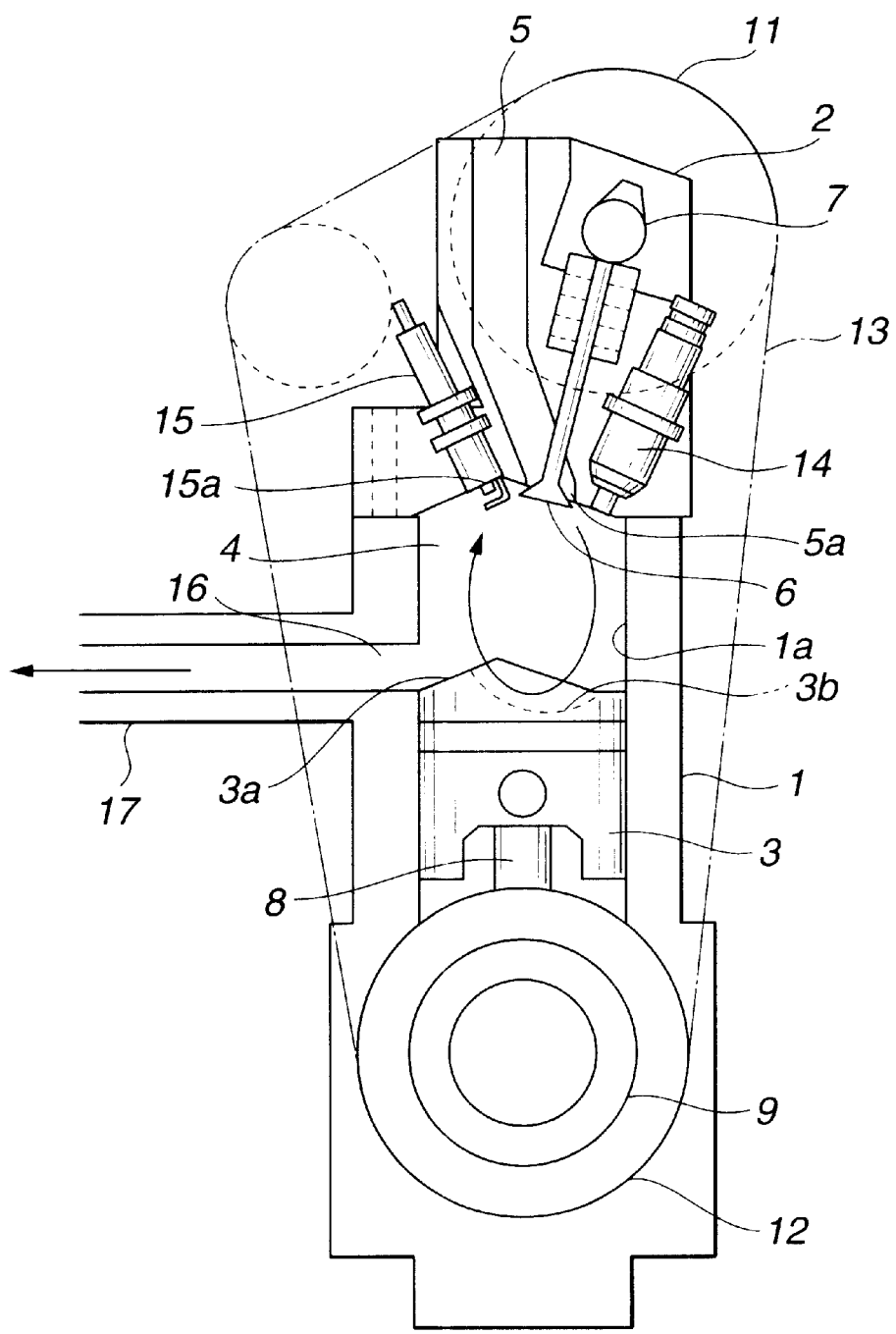

FIGS. 1 to 9 are diagrams of a first embodiment of the present invention, where reference numeral 1 represents a cylinder block 1 defining a cylinder 1a inside and numeral 2 denotes a cylinder head. Into the interior of the cylinder 1a, a piston 3 is inserted for reciprocating movements therein. A combustion chamber 4 is defined by the cylinder 1a,the cylinder head 2 and a top surface 3a of the piston 3.

A pair of scavenging ports 5 are formed in the cylinder head 2 to communicate with the combustion chamber 4. Each of these scavenging ports 5 is formed-to communicate with a scavenging passage (not shown). Incidentally, a scavenging pump is put in this scavenging passage.

Figure 4:
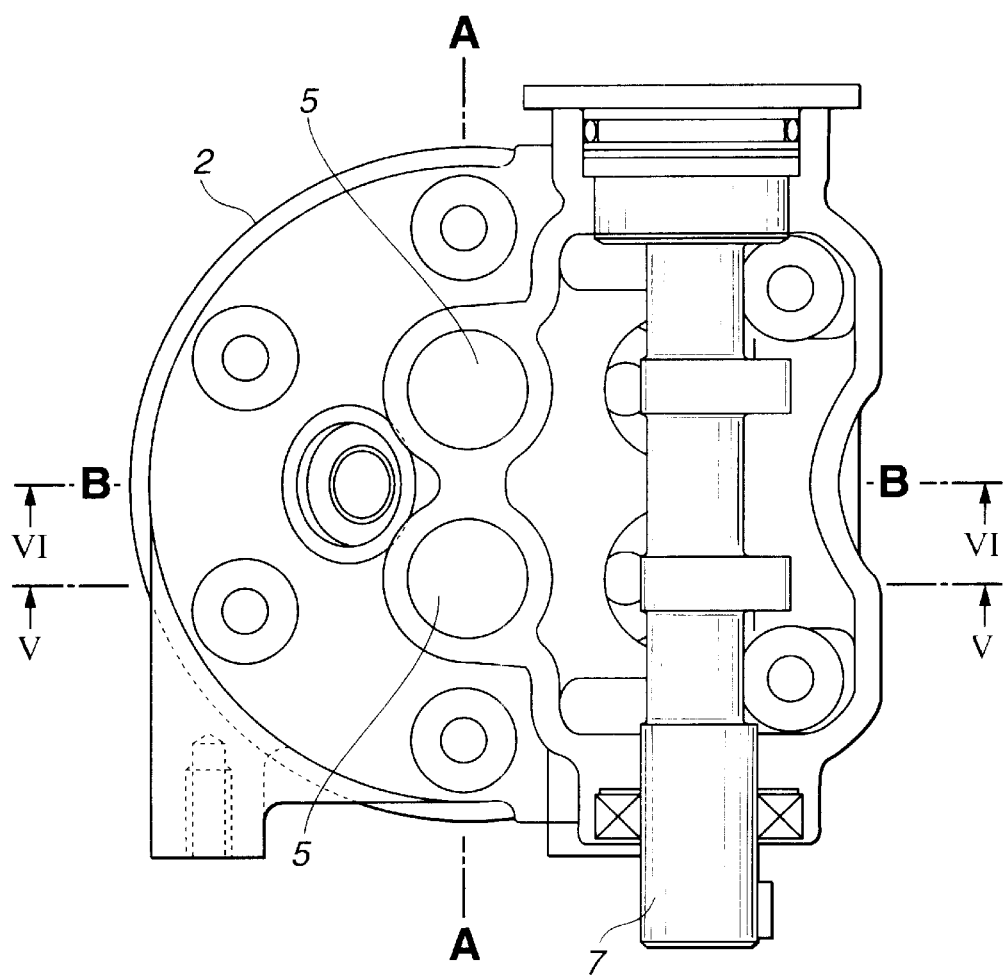
Figure 5:
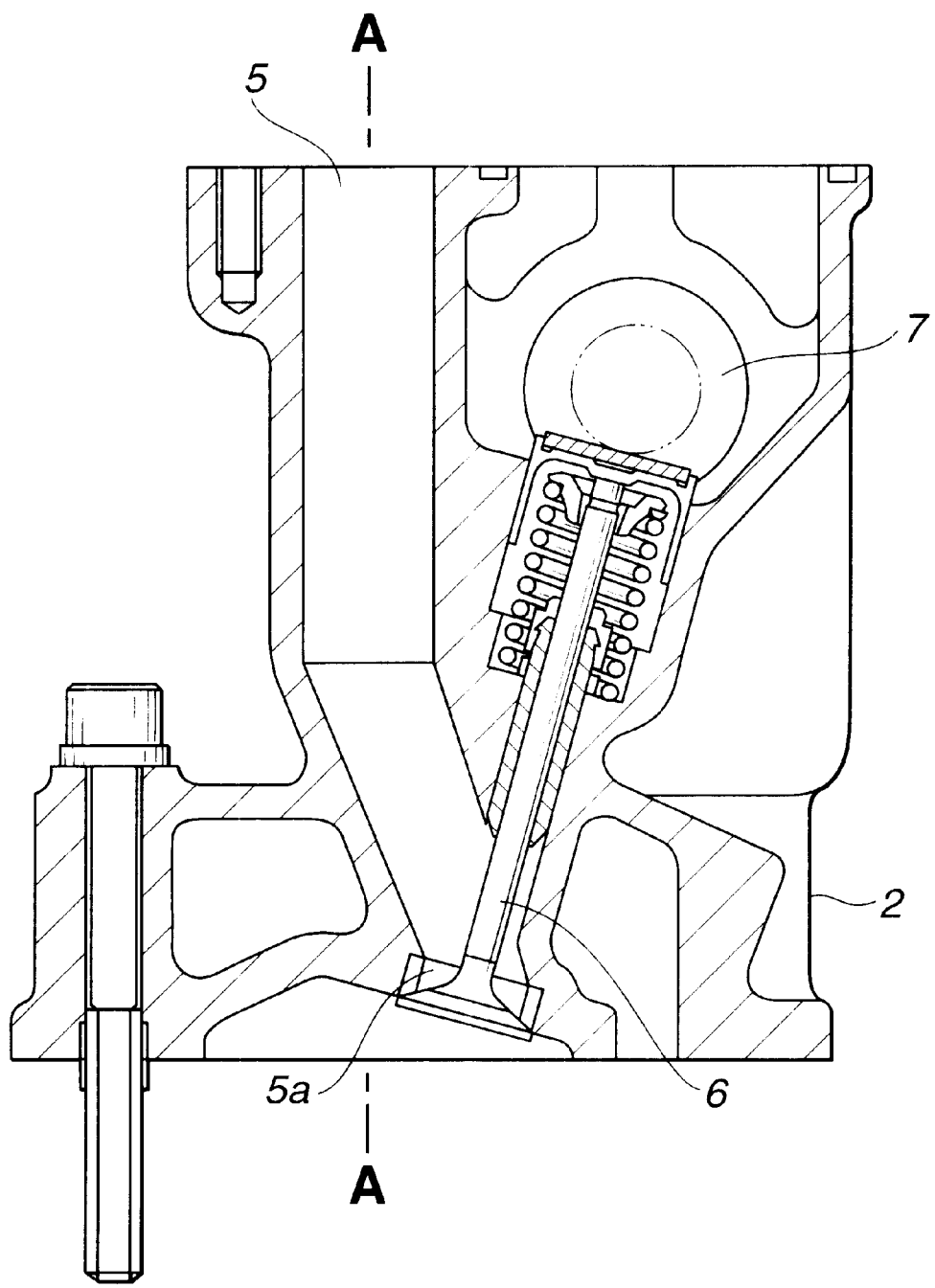
Figure 6:
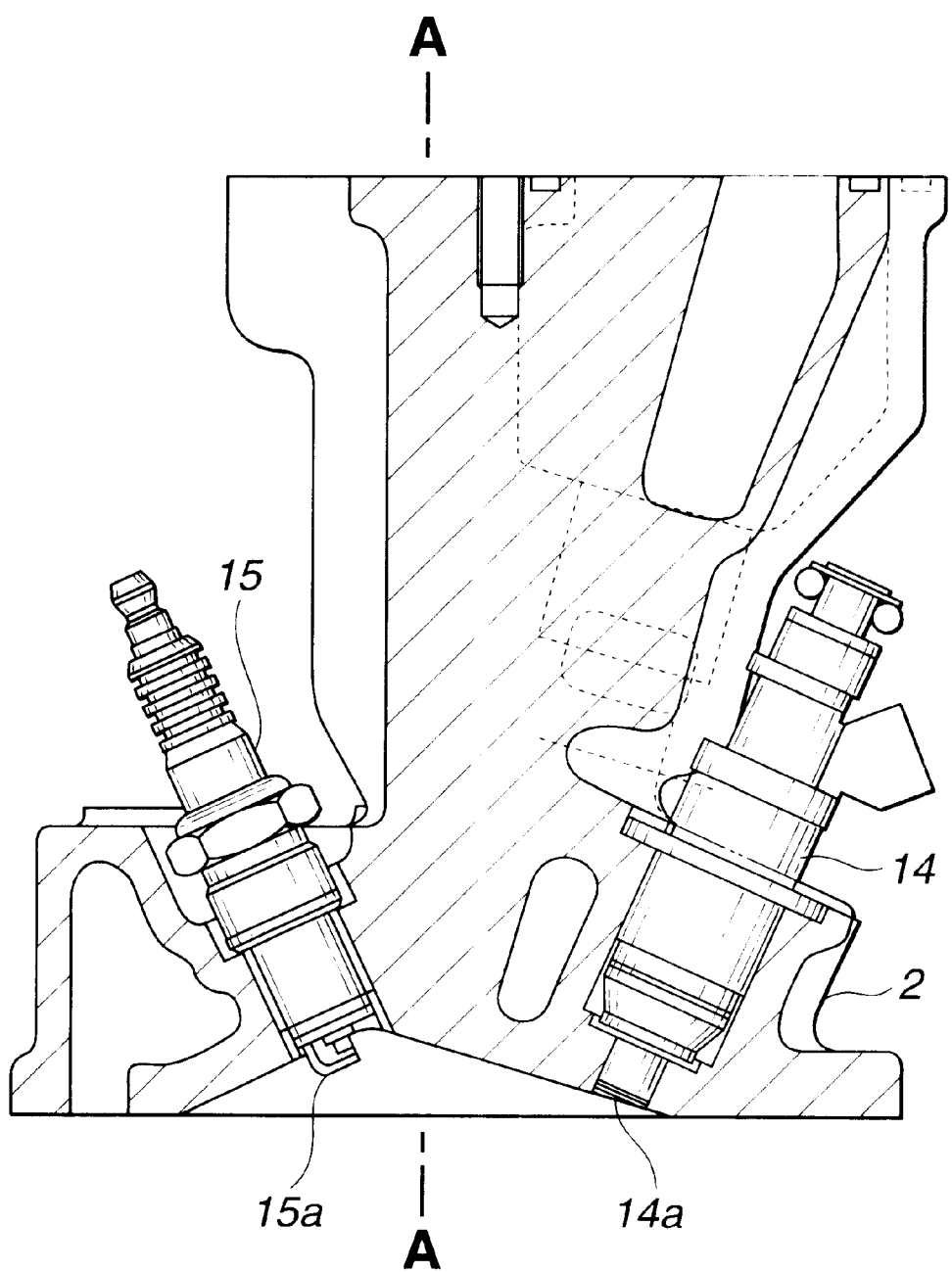

As FIGS. 4 and 5 show, the scavenging ports 5 are located on a virtual reference plane A—A including the center axis of the cylinder 1a and at substantially symmetrical positions with respect to the center axis of the cylinder 1a,and extend almost right above along the reference plane A—A.

Each of the scavenging ports 5 is, at its downstream side, bent in a deflected state to one direction with respect to the reference plane A—A. An opening end 5aformed at a downstream end of the scavenging port 5 is made open toward the reference plane A—A at a lower surface of the cylinder head 2. The passage configuration of this scavenging port 5 generates a scavenging flow toward the top surface 3a of the piston 3 when fresh air passes through this scavenging port 5.

In addition, a scavenging valve 6 is placed at the opening end 5a of each of the scavenging ports 5 to be openable and closable. A cam shaft 7 for establishing the openings and closures of this scavenging valve 6 and a crank shaft 9 connected through a connecting rod 8 to the piston 3 are coupled to each other through sprockets 11 and 12 respectively set over the cam shaft 7 and the crank shaft 9 and a timing belt 13 wound around these sprockets 11 and 12 (see FIG. 1). Thus, the scavenging valves 6 conducts (functions) the opening/closing operations in synchronism with the rotation of the crank shaft 9.

Still additionally, an injector 14 for in-cylinder injection is placed on the side where the opening end 5a of the scavenging port 5 is located in the deflected state with respect to the reference plane A—A of the cylinder head 2. A spark plug 15 is placed such that the opening end 5a is located between the spark plug 15 and the in-cylinder 14. An injection nozzle hole 14a formed in the tip portion of the in-cylinder injector 14 and an ignition portion(point) 15a formed at the tip portion of the spark plug 15 are exposed to the combustion chamber 4. The injection hole 14a of the in-cylinder injector 14 and the ignition portion 15a of the spark plug 15 are placed on an orthogonal plane B—B passing through the center axis of the cylinder 1a and perpendicular to the reference plane A—A.

Figure 2A:
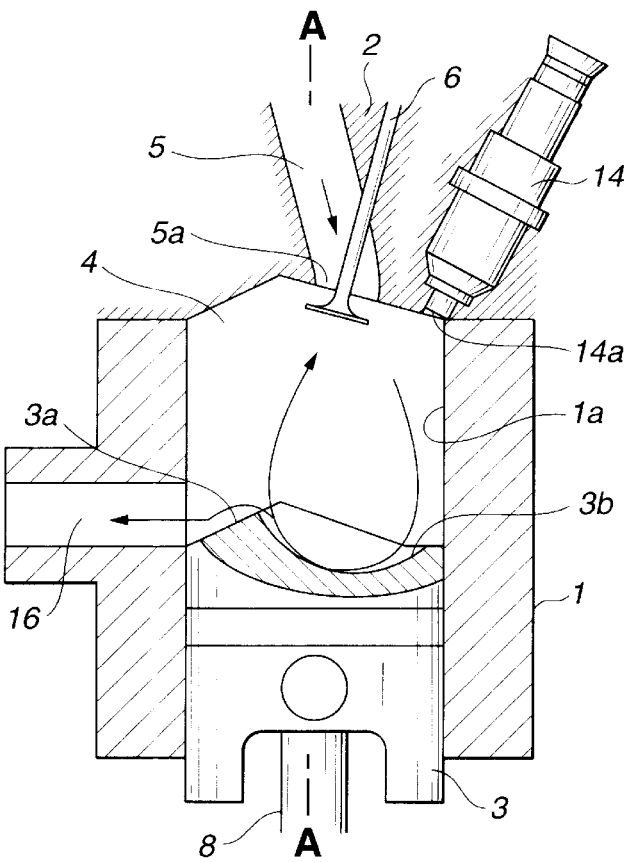
FIG. 2A is a vertical cross-sectional view showing the two-stroke engine in a scavenging stroke state.
Figure 2B:
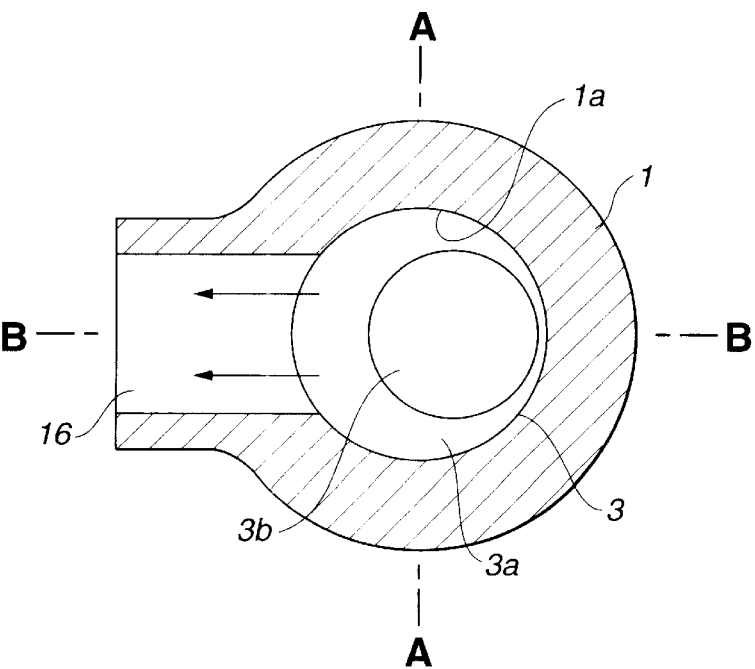
FIG. 2B is a horizontal cross-sectional view of the two-stroke engine.

Moreover, an exhaust port 16 opening and closing by the reciprocating movements of the piston 3 is formed at a lower portion of the combustion chamber 4 and on the other side relative to the reference plane A—A, and an exhaust passage 17 (see FIG. 1) is communicated to the exhaust port 16. As FIG. 2B shows, this exhaust port 16 is formed to be symmetric with respect to the orthogonal plane B—B, and a combustion gas is discharged through the exhaust port 16 to the exhaust passage 17 by downwardly scavenging flow fed through the scavenging ports 5, thereby scavenging the combustion gas from the interior of the combustion chamber 4.

Figure 7:
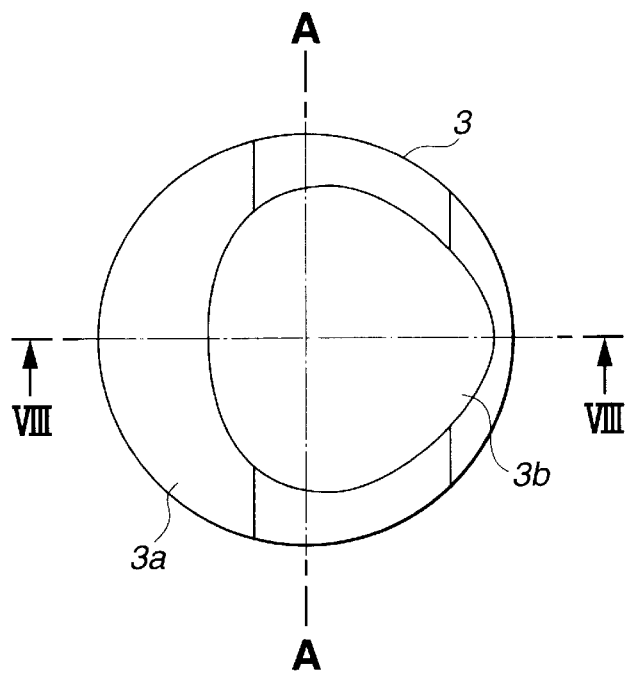
Figure 8:
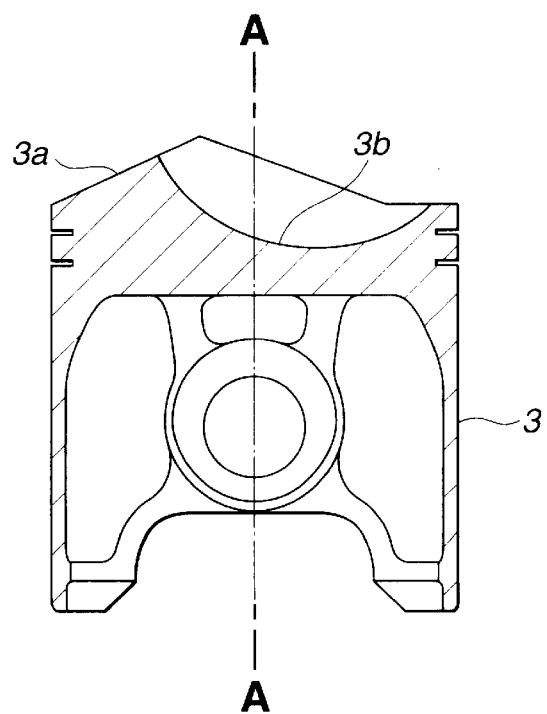

Furthermore, as FIGS. 7 and 8 show, a curved concave (cavity) 3b is formed on the top surface 3a of the piston 3. This curved concave 3b is for turning the downward scavenging flow from the scavenging port 5 to the upward direction in a layer maintained state to generate an reverse tumble flow, and is placed at a position corresponding to the scavenging flow from the scavenging port 5. That is, the scavenging port 5 which is deflected is positioned in an offset condition with respect to the reference plane A—A. In addition, this curved concave 3b has a spherical configuration in order to guide the scavenging flow upwardly in the layer maintained state and in a low-resistance condition.

Still furthermore, the top surface 3a of the piston 3 has a pent-roof configuration almost identical to a lower surface of the cylinder head 2 exposed to the combustion chamber 4. And when the piston 3 reaches the vicinity of the top dead center in a compression stroke, not only the scavenging flow gathers within the curved concave 3b, but also the ignition portion(point) 15a of the spark plug 15 faces an inside wall of the curved concave 3b from an edge side thereof, and even the injection nozzle hole 14a of the injector 14 faces the curved concave 3b.

Figure 3:
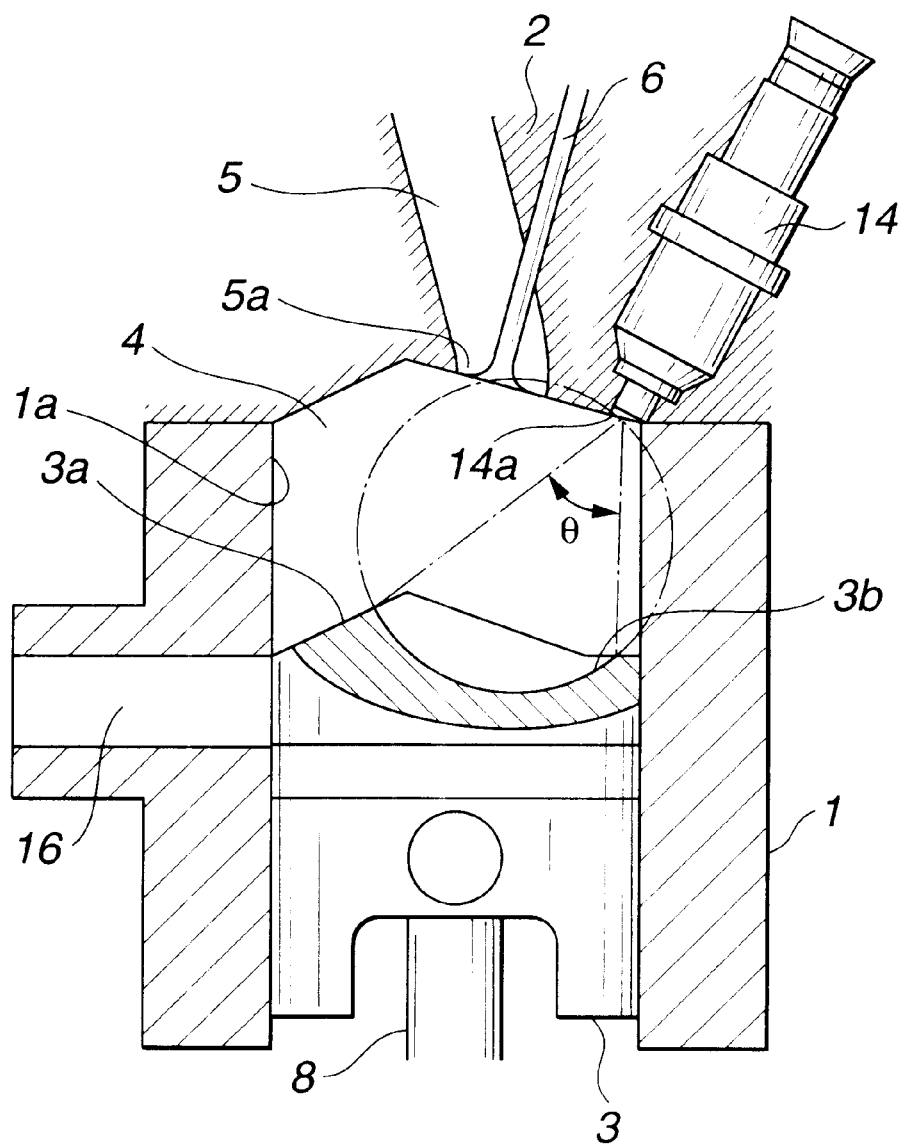

Moreover, in this embodiment, as FIG. 3 shows, the injection timing of the injector 14 is set such that the tip portion of a mist flow emitted from the injection hole 14a arrives at a slight inner side of an outer edge of the curved concave 3b just when the piston 3 closes the exhaust port 16, at the earliest time.

That is, the spray angle θ of the injection nozzle hole 14a formed in the injector 14 is set to be a little smaller than the angle of circumference of the curved concave 3b, and the injection nozzle hole 14a is located on the circumference defining the curved concave 3b and the injector 14 is placed at a position where the bisector of the angle of circumference coincides with the center axis of the spray angle θ. Thereby the air-fuel mixture can be confined in the curved concave 3b in the compression stroke so as to prevent the fuel blow-by.

In this connection, when the spray angle θ is larger than the angle of circumference of the curved concave 3b, in order to adjust the positional relationship between the tip portion of the fuel spray injected from the injection nozzle hole 14a and the outer edge of the concave 3b, the injection nozzle hole 14a is shifted along the center axis to the inner side on the circumference defining the concave 3b.

Figure 9:
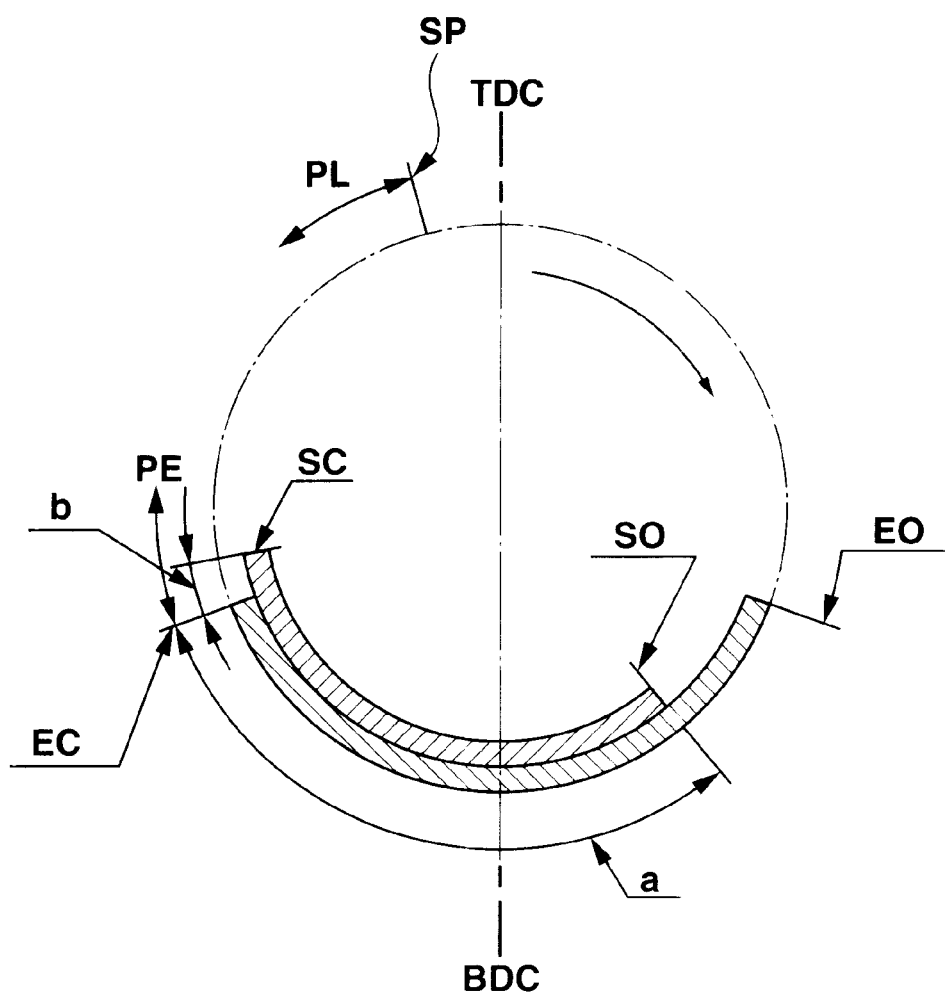

In addition, as FIG. 9 shows, in the case of the two-stroke engine according to this embodiment, the exhaust port 16 opens and. closes in accordance with the vertically reciprocating movements of the piston 3. The exhaust port 16 is set to take the opening condition (EO) in the vicinity of BBDC (Before Bottom Dead Center) of approximately 70 degrees with respect to the BDC (Bottom Dead Center) and set up the closure condition (EC) in the vicinity of ABDC (After Bottom Dead Center) of approximately 70 degrees with respect thereto. On the other hand, the scavenging port 5 is set so that the opening condition (SO) takes place in the vicinity of BBDC of approximately 40 degrees and the closing condition comes about in the vicinity of ABDC of approximately 80 degrees.

Accordingly, when the piston 3 moves downwardly, the exhaust port 16 first opens and then the scavenging port 5 opens. On the other hand, when the piston 3 rises, the exhaust port 16 first closes, followed by the closure of the scavenging port 5. The time period for which both the ports 16 and 5 are in the opening conditions makes a scavenging zone a indicated in FIG. 9.

When the operating condition is a high-load operation, the fuel injection timing is set such that the fuel injection from the injector 14 starts simultaneously with the closure of the exhaust port 16, or is synchronized with the timing such that the tip portion of the fuel spray arrives at the curved concave 3b of the piston 3 at the closure. In addition, the injector 14 injects the fuel for a predetermined injection time PE. On the other hand, when the operating condition is a low-load operation, the fuel injection timing is counted back on the basis of an ignition timing SP so that the fuel is injected for a predetermined injection time period PL from the calculated fuel injection start time.

Secondly, a description will be given hereinbelow of an operation of the two-stroke engine as follows:

In the middle of the piston 3 passing through the top dead center (TDC) and then advancing to the bottom dead center (BDC), the exhaust port 16 falls into the opening condition (EO) in the vicinity of BBDC of approximately 70 degrees, then followed by the opening (SO) of the scavenging valve 6 in the vicinity of BBDC of approximately 40 degrees.

With this arrangement, fresh air pressurized by the scavenging pump (not shown) is fed through the scavenging port 5 to the combustion chamber 4; whereupon, a downward scavenging flow moving toward the top surface 3a of the piston 3 occurs in the combustion chamber 4. In addition, this scavenging flow is guided into the concave 3b formed in the top surface 3a of the piston 3 and becomes an upward scavenging flow directed toward the ignition portion 15a of the spark plug 15, thereby forming an reverse tumble flow (vertical eddy).

In the meantime, since the exhaust port 16 is open to the side that the scavenging flow is guided by the concave 3b of the piston 3 to move upwardly, the combustion gas is forced out through the exhaust port 16 in a layer state(stratified condition) by the scavenging flow. This can provide a high scavenging efficiency (a high gas exchange rate).

Following this, in the course of the piston 3 passing through the bottom dead center (BDC) and then advancing to the top dead center (TDC), the exhaust port 16 takes the closure condition (EC) in the vicinity of ABDC of approximately 70 degrees, then followed by the closure of the scavenging port 5 in the vicinity of ABDC of approximately 80 degree; thereafter the operation shifts to a compression stroke.

When the exhaust port 16 falls into the closure condition, a large reverse tumble flow immediately occurs within the combustion chamber 4, and in a zone b from when the exhaust port 16 switches into the closure condition (EC) until the scavenging port 5 falls into the closure condition (SC), the fresh air further comes in by this tumble flow, thus offering a high charging efficiency.

Subsequently, when the piston 3 elevates to the vicinity of the top dead center (TDC), a squish, developing between the top surface 3a of the piston 3 and the lower surface of the cylinder head 2, runs against the reverse tumble flow to destroy this tumble flow so that it is centered at the curved concave 3b in a disturbed state, which contributes to the promotion of combustion after ignition.

In addition, if the operating condition at that time is a low-load operation, the fuel is injected into the curved concave 3b for a predetermined injection time period PL from a fuel injection start time counted back with an ignition time SP as a reference(see FIG. 9). Thus, the air-fuel mixture is stratified so that a relatively rich air-fuel mixture lies around the ignition portion 15a of the spark plug 15, thus providing excellent ignition characteristics. At this time, since the curved concave 3b is formed into a spherical configuration, the heat loss is reducible and stable combustion is achievable.

On the other hand, at a high-load operation, concurrently with the closure of the exhaust port 16 (alternatively, at the timing that the tip portion of the fuel spray reaches the concave 3b of the piston 3 at the closure), the fuel spray from the injector 14 starts and continues for a predetermined injection time period PE (see FIG. 9); therefore, it is possible to promote the mixing of the fuel injected therefrom and fresh air developing the reverse tumble flow, thereby achieving superior uniform combustion by this uniformed air-fuel mixture.

Furthermore, since the fuel spray angle θ of the injector 14 is set so that the tip portion of the fuel spray reaches a somewhat inner side of the outer edge of the concave 3b at the earliest timing, in the compression stroke, the air-fuel mixture is confined within the concave 3b to prevent the fuel short circuit, thereby enhancing the combustion efficiency at high-load operations.

Still furthermore, since the scavenging port 5 into which fresh air is introduced is situated(located) on the cylinder head 2 side, it is possible to readily change or control the gas flow in a manner that a valve body is provided in the scavenging port 5 for controlling eddy currents or that a shroud or the like is placed on the scavenging valve 6.

Figure 10:
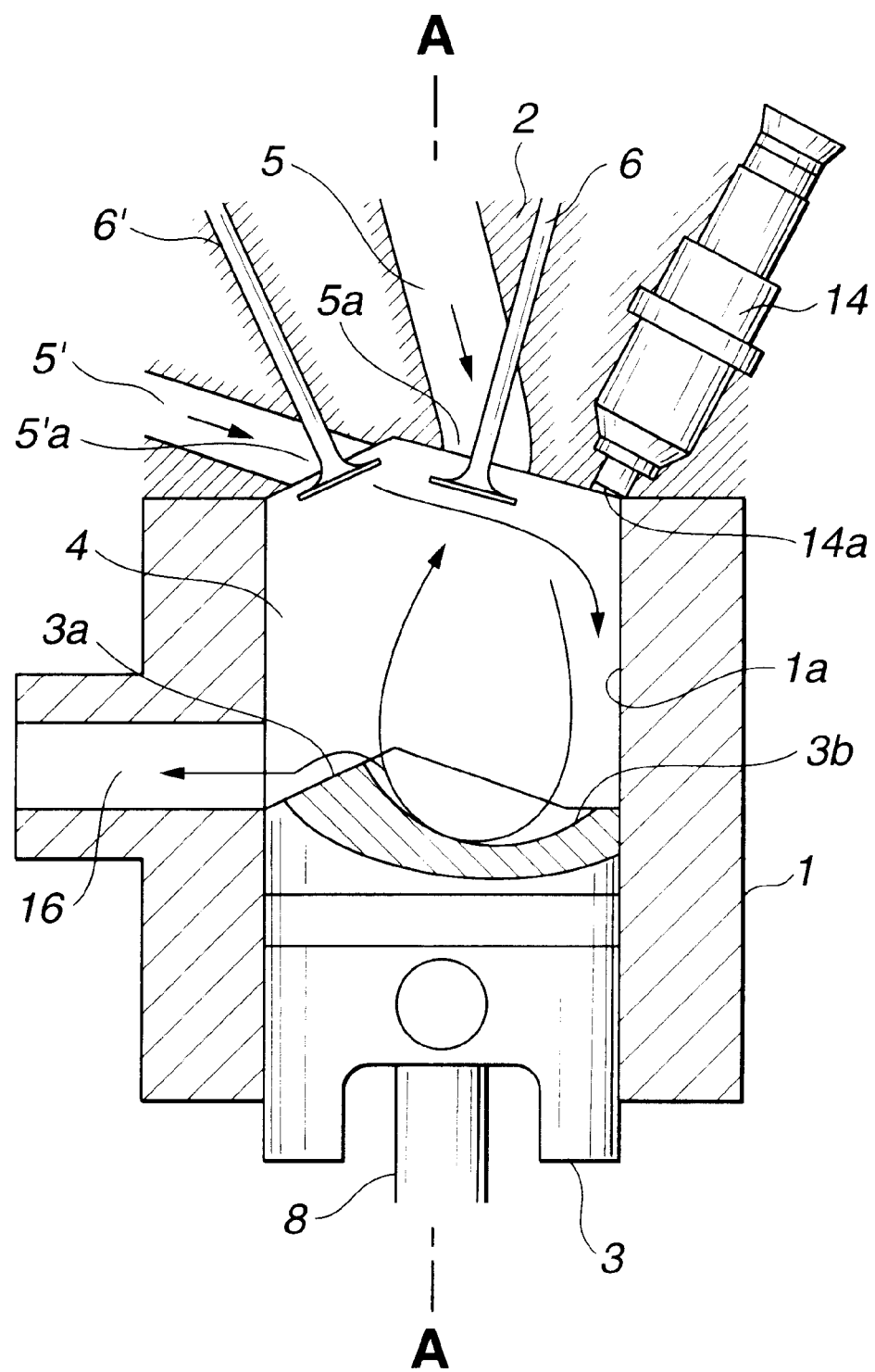
FIG. 10 is a vertical cross-sectional view showing the two-stroke engine in a scavenging stroke-state according to a second embodiment of the present invention.

Moreover, FIG. 10 is an illustration of a second embodiment of the present invention. In the above-described first embodiment, although scavenging ports 5 being two in number are formed in the cylinder head 2, in this embodiment, four scavenging ports-are formed in the cylinder head 2. Other structures are the same as those of the first embodiment.

That is, in addition to the structures according to the first embodiment, a pair of scavenging ports 5' are formed at positions corresponding to those of the scavenging ports 5 and opposite to the scavenging ports 5 with respect to the reference plane A—A. In this case, each scavenging port 5' and an opening end 5' a of each of the scavenging ports 5' has a configuration whereby a scavenging flow becomes a normal tumble flow directed toward the opening end 5a of the another scavenging port 5.

As described above, in this embodiment, in addition to the scavenging ports 5 for generating an reverse tumble flow, the scavenging ports 5' are formed to generate a normal tumble flow going in the same direction of the reverse tumble flow; therefore, a stronger tumble flow is produced in the combustion chamber 4 and a high engine output is obtainable because of the introduction of a large amount of fresh air.

Incidentally, the present invention is not limited to the above-described embodiments. For example, it is also appropriate that two or more exhaust ports 16 are put to use, or that auxiliary exhaust ports are formed on both the sides of the exhaust port 16.

It should be understood that the present invention covers a wider range including different embodiments which do not constitute departures from the spirit and scope of the invention. The present invention is not limited by specific embodiments other than the appending claims.

As described above, the present invention can improve the combustion efficiency at low-load operations and can control a scavenging flow introduced into a combustion chamber and a scavenging timing.

What is claimed is:

1. A two-stroke engine comprising:
   a cylinder block defining a cylinder;
   a piston reciprocally movable within said cylinder;
   a cylinder head which together with said piston and said cylinder defines a combustion chamber;
   an in-cylinder injector provided in said cylinder head;
   a curved concave formed on a top surface of said piston;
   at least one scavenging port including a first scavenging port which extends toward an inner side wall of said cylinder at a first side with respect to a reference plane passing through a center axis of said cylinder, and which is formed in said cylinder head to have an opening end adapted to be opened to said combustion chamber at said first side with respect to said reference plane for generating a tumble flow toward the top surface of said piston; and
   an exhaust port formed in said cylinder block to be opened to said cylinder at a second side with respect to said reference plane in accordance with reciprocal movement of said piston;
   wherein injection timing of said in-cylinder injector is set such that a mist flow emitted from said in-cylinder injector arrives at a slightly inner side of an outer edge of said curved concave of said piston when said piston closes said exhaust port at an earliest injection timing.

2. The two-stroke engine according to claim 1, further comprising:
   a second scavenging port formed in said cylinder head at said second side with respect to said reference plane for generating a flow in a same direction of said tumble flow.

3. The two-stroke engine according to claim 1, further comprising:
   an injector having an injection nozzle hole placed on a same side of said combustion chamber as said first scavenging port.

4. A two-stroke engine comprising:
   a cylinder block defining a cylinder;
   a piston reciprocally movable within said cylinder;
   a cylinder head which together with said piston and said cylinder defines a combustion chamber;
   at least one scavenging port including: (i) a first scavenging port which extends toward an inner side wall of said cylinder at a first side with respect to a reference plane passing through a center axis of said cylinder, and which is formed in said cylinder head to have an opening end adapted to be opened to said combustion chamber at said first side with respect to said reference plane for generating a tumble flow toward a top surface of said piston, and (ii) a second scavenging port formed in said cylinder head at a second side with respect to said reference plane for generating a flow in a same direction of said tumble flow; and an exhaust port formed in said cylinder block to be opened to said cylinder at said second side with respect to said reference plane in accordance with reciprocal movement of said piston.

5. The two-stroke engine according to claim 1, wherein:

said injection timing is set in accordance with a high-load operating condition of said engine.

6. The two-stroke engine comprising:

a cylinder block defining a cylinder;

a piston reciprocally movable within said cylinder;

a cylinder head which together with said piston and said cylinder defines a combustion chamber;

a curved concave formed on a top surface of said piston;

at least one scavenging port including a first scavenging port which extends toward an inner side wall of said cylinder at a first side with respect to a reference plane passing through a center axis of said cylinder, and which is formed in said cylinder head to have an opening end adapted to be opened to said combustion chamber at said first side with respect to said reference plane for generating a tumble flow toward the top surface of said piston;

an injector having an injection nozzle hole placed on a same side of said combustion chamber as said first scavenging port; and an exhaust port formed in said cylinder block to be opened to said cylinder at a second side with respect to said reference plane in accordance with reciprocal movement of said piston;

wherein said injection nozzle hole is placed on an orthogonal plane which passes through said center axis of said cylinder and which is perpendicular to said reference plane.

7. A two-stroke engine comprising:

a cylinder block defining a cylinder;

a piston reciprocally movable within said cylinder;

a cylinder head which together with said piston and said cylinder defines a combustion chamber;

an in-cylinder injector provided in said cylinder head;

a curved concave formed on a top surface of said piston;

at least one scavenging port including:

(i) a first scavenging port which extends toward an inner side wall of said cylinder at a first side with respect to a reference plane passing through a center axis of said cylinder, and which is formed in said cylinder head to have an opening end adapted to be opened to said combustion chamber at said first side with respect to said reference plane for generating a tumble flow toward a top surface of said piston, and (ii) a second scavenging port formed in said cylinder head at a second side with respect to said reference plane for generating a flow directed toward an opening end of said first scavenging port in order to strengthen said tumble flow; and an exhaust port formed in said cylinder block to be opened to said cylinder at said second side with respect to said reference plane in accordance with reciprocal movement of said piston.

8. The two-stroke engine according to claim 7, wherein:

said tumble flow generated by said first scavenging port is a reverse tumble flow, and said tumble flow generated by said second scavenging port is a normal tumble flow.

9. The two-stroke engine according to claim 7, wherein:

injection timing of said in-cylinder injector is set such that a mist flow emitted from said in-cylinder injector arrives at a slightly inner side of an outer edge of said curved concave of said piston when said piston closes said exhaust port at an earliest injection timing.

10. The two-stroke engine according to claim 9, wherein:

said injection timing is set in accordance with a high-load operating condition of said engine.

11. A two-stroke engine comprising:

a cylinder block defining a cylinder;

a piston reciprocally movable within said cylinder;

a cylinder head which together with said piston and said cylinder defines a combustion chamber;

at least one scavenging part including a first scavenging port which extends toward an inner side wall of said cylinder and is positioned in an offset condition at a first side with respect to a reference plane passing through a center axis of said cylinder, and which is formed in said cylinder head to have an opening end adapted to be opened to said combustion chamber at said first side with respect to said reference plane for generating a tumble flow toward a top surface of said piston;

an exhaust port formed in said cylinder block to be opened to said cylinder at a second side with respect to said reference plane in accordance with reciprocal movement of said piston; and a curved concave formed on the top surface of said piston for turning upward a downward scavenging flow from said scavenging port to generate said tumble flow.

12. The two-stroke engine according to claim 11, wherein:

said scavenging port is bent in a deflected state to one direction with respect to said reference plane at a downstream side; and said curved concave is placed at a position corresponding to the scavenging flow from said scavenging port.

13. The two-stroke engine according to claim 11, wherein:

said scavenging port is bent in a deflected state to one direction with respect to said reference plane at a downstream side; and said curved concave is positioned in an offset condition with respect to the reference plane in a same direction as said scavenging port.

* * * * *